US012596560B2

(12) United States Patent
    Belkar et al.

(10) Patent No.: US 12,596,560 B2
(45) Date of Patent: Apr. 7, 2026

(54) HETEROMORPHIC I/O DISCOVERY AND HANDSHAKE

(71) Applicant: Huawei Technologies Co., Ltd., Shenzhen (CN)

(72) Inventors: Ben-Shahar Belkar, Hod Hasharon (IL); Lior Khermosh, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 932 days.

(21) Appl. No.: 17/736,791

(22) Filed: May 4, 2022

(65) Prior Publication Data

US 2022/0261263 A1     Aug. 18, 2022

Related U.S. Application Data

(63) Continuation of application No. PCT/EP2020/075242, filed on Sep. 9, 2020.

(51) Int. Cl.
    *G06F 9/455* (2018.01)
    *G06F 13/10* (2006.01)

(52) U.S. Cl.
    CPC ...... *G06F 9/45533* (2013.01); *G06F 9/45558* (2013.01); *G06F 13/102* (2013.01); *G06F 13/105* (2013.01); *G06F 2009/45579* (2013.01); *G06F 2009/45583* (2013.01); *G06F 2009/45595* (2013.01)

(58) Field of Classification Search
    None
    See application file for complete search history.

(56) References Cited

U.S. PATENT DOCUMENTS

| | | | |
|---|---|---|---|
| 2018/0113731 A1* | 4/2018 | Cheng | G06F 9/45558 |
| 2018/0349161 A1 | 12/2018 | Jain et al. | |
| 2021/0103536 A1* | 4/2021 | Galles | G06F 13/385 |
| 2021/0157621 A1* | 5/2021 | Galles | H04L 47/70 |
| 2021/0216305 A1* | 7/2021 | Rathore | G06F 8/65 |
| 2021/0314303 A1* | 10/2021 | Kittur | G06F 13/28 |

OTHER PUBLICATIONS

Written Opinion of the International Searching Authority for PCT/EP2020/075242, Mar. 7, 2023. (Year: 2023).*

(Continued)

*Primary Examiner* — Qing Yuan Wu

(74) *Attorney, Agent, or Firm* — Leydig, Voit & Mayer, Ltd.

(57) ABSTRACT

A virtual function (VF) driver is provided, which receives an indication of base address registers (BARs) exposed by an I/O device providing virtualized hardware resources for use by the VF driver. The VF driver performs an internal probe and analysis to determine a target adaptation of at least one of the BARs exposed by the I/O device. A physical function (PF) driver receives a request message from the VF driver to adapt at least one of the BARs exposed by the I/O device. The BARs exposed by the I/O device are adapted by the PF driver according to the request message. A confirmation message is provided to the VF driver indicating the adaptation to the BARs exposed by the I/O device. The VF driver accesses regions of memory allocated to the adapted BARs exposed by the I/O device.

16 Claims, 5 Drawing Sheets

(56) References Cited

OTHER PUBLICATIONS

Peripheral Component Interconnect Special Interest Group, "PCI Express Architecture Configuration Space," Test Specification, Revision 3.0, 3855 SW 153rd Drive Beaverton, OR, 97003, US, Total 378 pages (Jun. 6, 2013).

"Intel Ethernet Adaptive Virtual Function (AVF) Hardware Architecture Specification (HAS)," Networking Division, 336311-002, Revision: 1.0, Total 90 pages, Intel Corporation (Feb. 2018).

* cited by examiner

HETEROMORPHIC I/O DISCOVERY AND HANDSHAKE

CROSS-REFERENCE TO RELATED APPLICATIONS

This application is a continuation of International Application No. PCT/EP2020/075242, filed on Sep. 9, 2020, the disclosure of which is hereby incorporated by reference in its entirety.

BACKGROUND

Embodiments of the present disclosure relate to virtual machines (VM), more specifically, but not exclusively, to communication between VMs and virtualized resources of physical hardware devices.

Hardware resources, in particular I/O devices such as storage devices, accelerator hardware, and network interfaces, may be virtualized. The virtualization of the hardware resources allows multiple VMs to share the same hardware resources.

SUMMARY

It is an object of the present disclosure to provide a computing device, a method, and a computer-readable storage medium for virtualized hardware resources of an input/output (I/O) device.

The foregoing and other objects are achieved by the features of the independent claims. Further implementation forms are apparent from the dependent claims, the description and the figures.

According to a first aspect, a computing device in communication with an input/output, I/O, device providing virtualized hardware resources for use by a plurality of virtual function (VF) drivers of a plurality of virtual machines (VM), the computing device executing a virtual machine manager (VMM), that implements a physical function (PF) driver and a plurality of base address registers (BAR), exposed by the I/O device, wherein the PF driver corresponds to the plurality of VF drivers implemented by the plurality of VMs, the PF driver configured to: receive a request message from a VF driver of the plurality of VF drivers, the request message including a request to adapt at least one of the BARs exposed by the I/O device, adapt the at least one of the BARs exposed by the I/O device according to the request message, and provide a confirmation message to the VF driver indicating the adaptation to the at least one of the BARs exposed by the I/O device.

According to a second aspect, a computing device executing a VF driver running on a VM, the VF driver corresponding to a PF driver and an input/output, I/O, device providing virtualized hardware resources, the VF driver configured to: receive an indication of a plurality of BARs exposed by the I/O device, perform an internal probe and analysis to determine a target adaptation of at least one of the BARs exposed by the I/O device, send a request message to the PF driver, the request message including a request to perform the target adaption of the at least one of the BARs exposed by the I/O device, receive a confirmation message from the PF driver indicating that the target adaption to the at least one of the BARs exposed by the I/O is implemented, and access regions of memory allocated to the plurality of BARs exposed by the I/O device and adapted according to the adaptation.

According to a third aspect, a method comprises receiving by a PF driver, a request message from a VF driver of the plurality of VF drivers, the request message including a request to adapt at least one of the BARs exposed by the I/O device, adapting by the PF driver the at least one of the BARs exposed by the I/O device according to the request message, and providing a confirmation message to the VF driver indicating the adaptation to the at least one of the BARs exposed by the I/O device.

According to a fourth aspect, a method comprises, receiving by a VF driver, an indication of a plurality of BARs exposed by an I/O device, performing an internal probe and analysis to determine a target adaptation of at least one of the BARs exposed by the I/O device, sending by the VF driver a request message to the PF driver, the request message including a request to perform the target adaption of the at least one of the BARs exposed by the I/O device, receiving a confirmation message from the PF driver indicating that the target adaption to the at least one of the BARs exposed by the I/O is implemented, accessing regions of memory allocated to the plurality of BARs exposed by the I/O device and adapted according to the adaptation.

At least some of the computing devices, methods, and/or code instructions described herein address the technical problem of allocation of virtualized resources of an I/O device to VMs. At least some of the computing devices, methods, and/or code instructions described herein improve over standard approaches of allocation of virtualized resources of an I/O device to VMs. Using standard approaches, each VF driver of each VM is advised of the BARs that are exposed by the I/O device. The exposed BARs are fixed for the VF driver. Effectively, the VF driver is 'locked' to the specific I/O device setup. Changes to the exposed BARs are performed on the side of the I/O device itself, and require a new installation of a new version of the VF driver that is compatible to the changes of the I/O device. The problem is especially pronounced in datacenters, such as cloud services, where a large number of VMs are executed (e.g., thousands). Moreover, code executing on the VMs may be imported by external customers using the cloud service. As such, the fixed I/O device BAR setup may be unsuitable for the different requirements of the many different VF drivers of the VFs.

In contrast, at least some embodiments described herein address the above mentioned technical problem, and/or provide the above mentioned improvement, by enabling the VF driver to request adaptations to the BARs exposed by the I/O device. For example, in order to improve performance of an application and/or featuring running on the VM, and/or to enable an application and/or feature to run on the VM (where the application and/or feature cannot run on the VM machine when the adaptation to the BARs is not performed). For example, a certain application and/or feature that cannot run efficiently using a standard 16 Kilobyte memory space, for example, when the memory space is used for MSI-X interrupts, which can create a higher latency if many queues are using the same vector, when the VF uses more queues and wants each queue to have its own interrupt vector. The VF driver may request an increase in the memory space to 2 megabytes, which can enlarge the number of MSI-X vectors. In another example, the VM provides Remote direct memory access (RDMA) services. The VF driver may request additional BARs and/or larger BARs in order to have sufficiency memory to isolate different regions of the memory.

At least some embodiments described herein enable adaptations of the BARs exposed by the I/O according to the requirement of each VF driver running on respective VM. Since different VMs may be running different VF drivers, such as different versions of the VF driver with different features and/or capabilities, the configuration of the BARs exposed by the I/O device may not be efficient or even suitable for all VF drivers. Using standard approaches, the VF drivers need to be upgraded, which in cloud based environments running thousands of VMs is impractical and/or requires tremendous effort. At least some embodiments described herein enable each VF driver to adapt the BARs exposed by the I/O device according to its own requirement, enabling different versions of the same VF driver and/or different VF drivers to interface with the same I/O device. Moreover, different versions of the same I/O device may be released, without requiring a re-upgrade of the VF drivers. New I/O hardware may adapt to old VF driver I/O device BAR expected functionality by showing the VF driver its expected BAR space during negotiation. The VF driver may adapt its functionality to multiple I/O devices, which may have different I/O device BAR space configurations.

In a further implementation form of the first, second, third, and fourth aspects, the request to adapt at least one of the BARs exposed by the I/O device comprises at least member selected from a group consisting of: increasing a size of a memory corresponding to a certain BAR, increasing a number of a certain BAR, and adapting a structure of a certain BAR.

The VF driver may request changes to the structure of the BARs, i.e., change in size of the memory corresponding to one or more BARs, and/or a change (e.g., increase) in number of BARs.

In a further implementation form of the first, second, third, and fourth aspects, the PF device is further configured to: in response to receiving the request message from the VF driver, transmit data to the VM that triggers an unloading of the VF driver, in respond to unloading of the VF driver, adapting the at least one of the BARs exposed by the I/O device is adapted according to the request message, in response to completing the adaptation to the at least one of the BARs exposed by the I/O device, transmit instructions to the VM to perform a hot-swap by reloading the VF driver without rebooting the VM, wherein after completion of a re-enumeration and/or re-scan (hot-swap) performed by the VM, the loaded VF driver identifies the adapted at least one BAR exposed by the I/O device.

The VF driver may be "hot swapped" and/or act as a "hotplug", by the unload, and reloading again over what appears to the VF driver as a new I/O device, which is actually the existing I/O device that has been adapted according to the request of the VF driver. The hot-swapped VF exposes the adapted BAR(s) for the VF driver.

In a further implementation form of the first, second, third, and fourth aspects, the request to adapt at least one of the BARs exposed by the I/O device comprises at least one member selected from the group consisting of: adapting of an existing role of a certain BAR to a new role and adapting a structure of a certain BAR.

The VF driver may request a change of a role of the existing BAR(s).

In a further implementation form of the first, second, third, and fourth aspects, VF driver uses the certain BAR to perform the new role during operation thereof, without an unload and reload cycle.

The VF driver does not need to necessarily unload and reload for the change of role to be effective, but may continue to operate.

In a further implementation form of the first, second, third, and fourth aspects, the request to adapt at least one of the BARs exposed by the I/O device comprises a first request, in response to which the VF driver is instructed to unload and reload as a reloaded VF driver, the first request includes at least member selected from a group consisting of: increasing a size of a memory corresponding to a certain BAR, and increasing a number of a certain BAR, and wherein the VF driver provides a second request including the request to adapt at least one of the BARs exposed by the I/O device comprises at least one member selected from the group consisting of: adapting of an existing role of a certain BAR to a new role, in response to which the reloaded VF driver uses the certain BAR to perform the new role during operation thereof, without an unload and reload cycle.

In a further implementation form of the first, second, third, and fourth aspects, the PF device is further configured to: provide the VF driver with an indication of an initial configuration of the BARs exposed by the I/O device, the initial configuration representing a minimal configuration to support a set of basic capabilities negotiated between the VF driver and the PF driver, wherein the request to adapt comprises a request to expand the minimal configuration to support a set of advanced capabilities negotiated between the VF driver and the PF driver.

The initial configuration which may be expanded improves utilization and/or computational efficiency arising from the configuration of the BARs. The initial configuration may represent the minimal requirements to run basic features, which provides maximal initial utilization and/or computational efficiency by allocation of minimal resources. The initial configuration may include the minimal number of BARs and/or smallest memory footprint BARs, such as to enable the basic set of capabilities. The initial configuration may be expanded as needed according to the requests of the VF drivers, for example, by increasing the number of BARs and/or increasing the size of memory corresponding to the BARs. Different VF drivers may expand the initial configuration according to their own respective requirements.

At least some embodiments provide increased ability to discover and negotiate capabilities between the VF driver and I/O device, over standard approaches where the negotiation of the capabilities is limited by the fixed BARs exposed by the I/O device.

In a further implementation form of the first, second, third, and fourth aspects, the PF device is further configured to: negotiate with the VF driver on a set of adaptations to the at least one of the BARs exposed by the I/O device for implementation, wherein adapt comprises adapt the at least one BAR according to the negotiated set of adaptations.

The VF driver and PF driver may negotiate on which of the adaptations is implemented, providing flexibility to the VF driver and the PF driver in selecting and implementing the adaptations to the BARs.

In a further implementation form of the first, second, third, and fourth aspects, negotiate comprises: analyze the request message to determine which of the requested adaptations of the at least one of the BARs exposed by the I/O device are implementable, provide a negotiation message to the VF driver with an indication of which of the adaptations of the at least one of the BARs exposed by the I/O device are implementable, receive a response to the negotiation message from the VF driver indicating which of the implementable adaptations of the at least one of the BARs exposed by the I/O device implementable the VF driver selects to implement, wherein adapt comprises adapt the at least one of the BARs exposed by the I/O device according to the response to the negotiation message.

In a further implementation form of the first, second, third, and fourth aspects, the PF driver is further configured to adapt the at least one BAR of the I/O device according to the request via a hardware mailbox process.

The mailbox may be part of a mutual operation that uses the initial configuration of the BARs designed to provide common functionality of basic functions.

In a further implementation form of the first, second, third, and fourth aspects, the I/O device implements a protocol for virtualizing hardware resources thereof based on the Peripheral Component Interconnect Express (PCIe) standard.

In a further implementation form of the first, second, third, and fourth aspects, PCIe implements single-root input/output virtualization, SR-IOV.

In a further implementation form of the first, second, third, and fourth aspects, a plurality of instances of an adaptive VF (AVF) and/or assignable device interface (ADI) are implemented as the plurality of VF drivers, the plurality of instances of the AVF are mapped to the PF driver implemented as a single common PF driver, wherein adapted the at least one BAR expose by the I/O device is used by the plurality of VMs implementing the plurality of instances of the AVF and/or ADI.

In a further implementation form of the second and fourth aspect, the internal probe and analysis to determine the target adaptation of at least one of the BARs exposed by the I/O device is performed during a bootup of the VF driver and negotiation phase of the VF driver in negotiating basic and/or advanced capabilities with the PF driver.

In a further implementation form of the second and fourth aspect, the internal probe and analysis to determine the target adaptation of at least one of the BARs exposed by the I/O device is performed dynamically during operation of a feature and/or application and/or loading of the feature and/or the application executed using the BARs exposed by the I/O device, the target adaptation selected to improve performance and/or enable operation of the feature and/or application.

The method according to the third aspect may be performed by a computer-readable storage medium storing program code, the program code comprising instructions, which when performed on a computer cause the computer to perform the method according to the third aspect.

The method according to the fourth aspect may be performed by a computer-readable storage medium storing program code, the program code comprising instructions, which when performed on a computer cause the computer to perform the method according to the fourth aspect.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
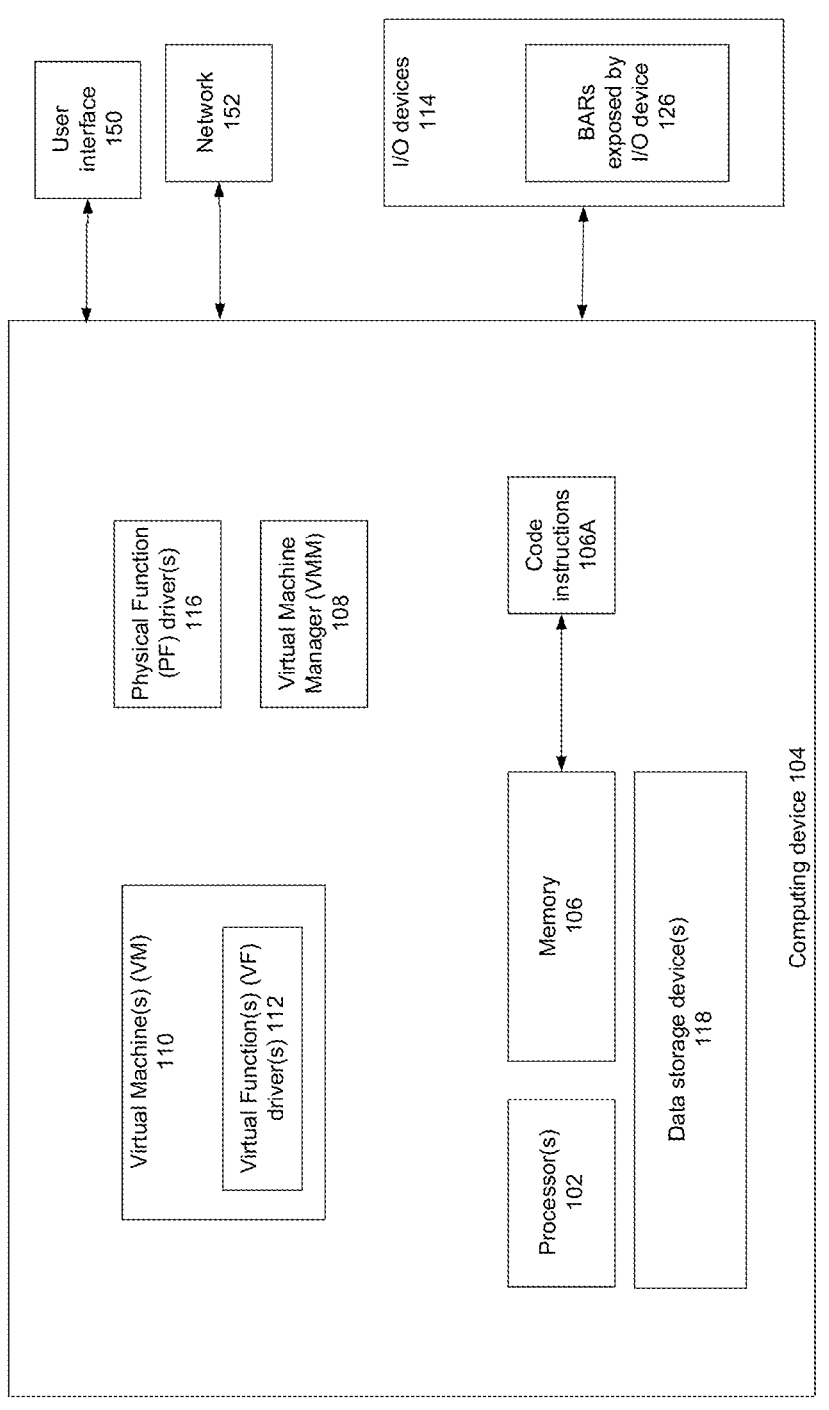
FIG. 1 is a block diagram of components of a computing device for dynamic adaptation, by a PF driver, of one or more BARs exposed by an I/O device providing virtualized hardware resources, according to a request from a VF driver executing on a VM, in accordance with some embodiments.

The present disclosure, in some embodiments thereof, relates to virtual machines (VM), and, more specifically, but not exclusively, to communication between VMs and virtualized resources of physical hardware devices.

An aspect of some implementations of the systems methods, apparatus, and/or code instructions described herein relates to dynamic adaptation, by a physical function (PF) driver, of one or more base address registers (BARs) exposed by an I/O device providing virtualized hardware resources, according to a request from a virtual function (VF) driver executing on a virtual machine (VM) to perform a target adaptation. Exemplary target adaptations include: increasing a size of a memory corresponding to a certain BAR, increasing a number of a certain BAR, and adapting a structure of a certain BAR. For some BAR adaptations, the VM may perform a hot-swap by reloading the VF driver without rebooting the VM. A re-enumeration and/or re-scan performed by the loaded and hot-swapped VF driver identifies the adapted BAR(s) exposed by the I/O device. The VF driver may be "hot swapped" and/or act as a "hotplug", by the unload, and reloading again over what appears to the VF driver as a new I/O device, which is actually the existing I/O device that has been adapted according to the request of the VF driver. The hot-swapped VF exposes the adapted BAR(s) for the VF driver.

The VF driver may receive an initial indication of the BARs exposed by the I/O device. The VF driver may perform an internal probe and/or analysis to determine a target adaptation of the BARs exposed by the I/O device, and send the request to perform the target adaptation to the PF adaptation. In response to receiving a confirmation message from the PF driver indicating that the target adaption to the BARs exposed by the I/O is implemented, the VF driver accesses regions of memory allocated to the BARs exposed by the I/O device and adapted according to the target adaptation.

At least some of the computing devices, methods, and/or code instructions described herein address the technical problem of allocation of virtualized resources of an I/O device to VMs. At least some of the computing devices, methods, and/or code instructions described herein improve over standard approaches of allocation of virtualized resources of an I/O device to VMs. Using standard approaches, each VF driver of each VM is advised of the BARs that are exposed by the I/O device. The exposed BARs are fixed for the VF driver. Effectively, the VF driver is 'locked' to the specific I/O device setup. Changes to the exposed BARs are performed on the side of the I/O device itself, and require a new installation of a new version of the VF driver that is compatible to the changes of the I/O device. The problem is especially pronounced in datacenters, such as cloud services, where a large number of VMs are executed (e.g., thousands). Moreover, code executing on the VMs may be imported by external customers using the cloud service. As such, the fixed I/O device BARs setup may be unsuitable for the different requirements of the many different VF drivers of the VFs.

In contrast, at least some embodiments described herein address the above mentioned technical problem, and/or provide the above mentioned improvement, by enabling the VF driver to request adaptations to the BARs exposed by the I/O device. For example, in order to improve performance of an application and/or featuring running on the VM, and/or to enable an application and/or feature to run on the VM (where the application and/or feature cannot run on the VM machine when the adaptation to the BARs is not performed). For example, a certain application and/or feature that cannot run efficiently using a standard 16 Kilobyte memory space, for example, when the memory space is used for MSI-X interrupts, which can create a higher latency if many queues are using the same vector, when the VF uses more queues and wants each queue to have its own interrupt vector. The VF driver may request an increase in the memory space to 2 megabytes, which can enlarge the number of MSI-X vectors. In another example, the VM provides Remote direct memory access (RDMA) services. The VF driver may request additional BARs and/or larger BARs in order to have sufficiency memory to isolate different regions of the memory.

At least some embodiments described herein enable adaptations of the BARs exposed by the I/O according to the requirement of each VF driver running on respective VM. Since different VMs may be running different VF drivers, such as different versions of the VF driver with different features and/or capabilities, the configuration of the BARs exposed by the I/O device may not be efficient or even suitable for all VF drivers. Using standard approaches, the VF drivers need to be upgraded, which in cloud based environments running thousands of VMs is impractical and/or requires tremendous effort. At least some embodiments described herein enable each VF driver to adapt the BARs exposed by the I/O device according to its own requirement, enabling different versions of the same VF driver and/or different VF drivers to interface with the same I/O device. Moreover, different versions of the same I/O device may be released, without requiring a re-upgrade of the VF drivers. New I/O hardware may adapt to old VF driver I/O device BAR expected functionality by showing the VF driver its expected BARs space during negotiation. The VF driver may adapt its functionality to multiple I/O devices, which may have different I/O device BAR space configurations.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
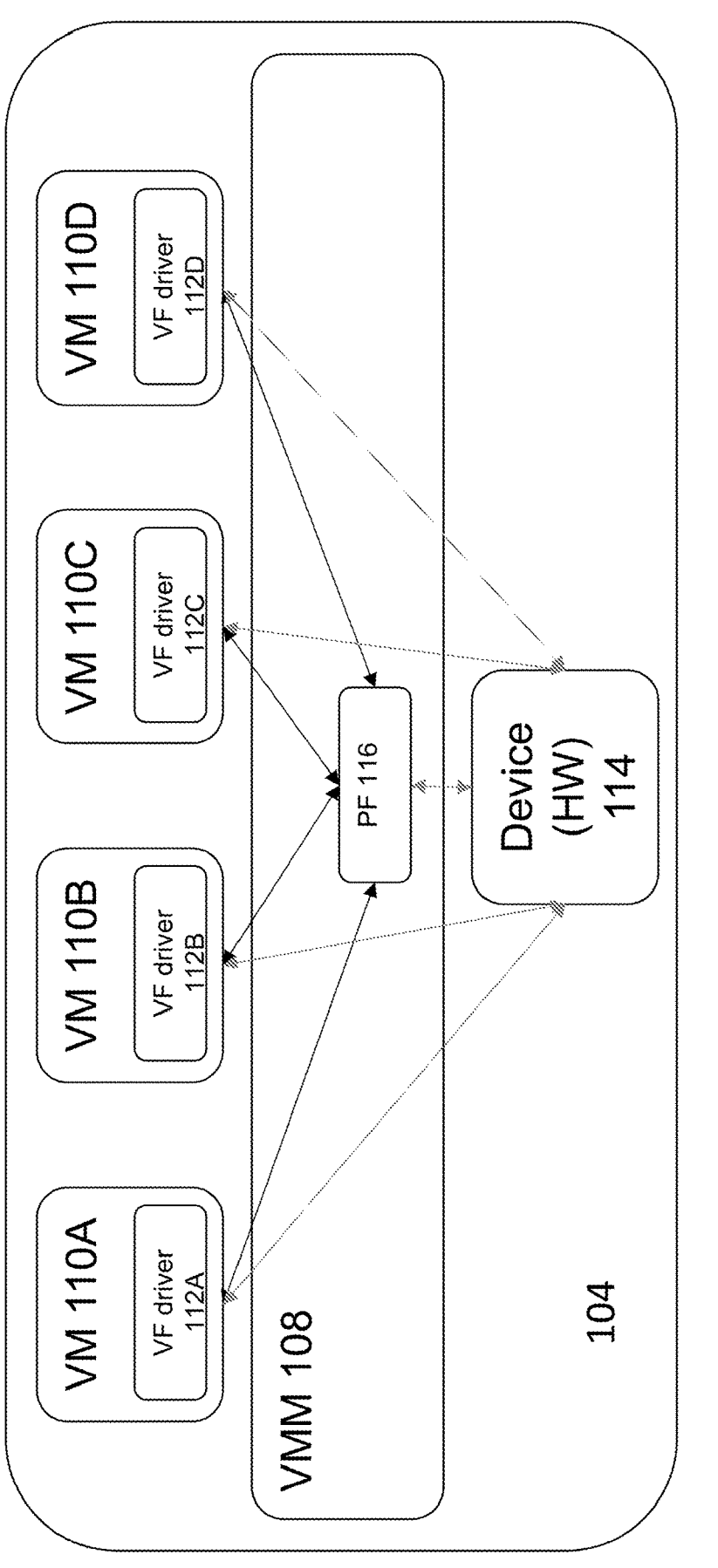
FIG. 2 is a schematic depicting exemplary dataflow between components of computing device 104 described with reference to FIG. 1, in accordance with some embodiments.
Figure 3:
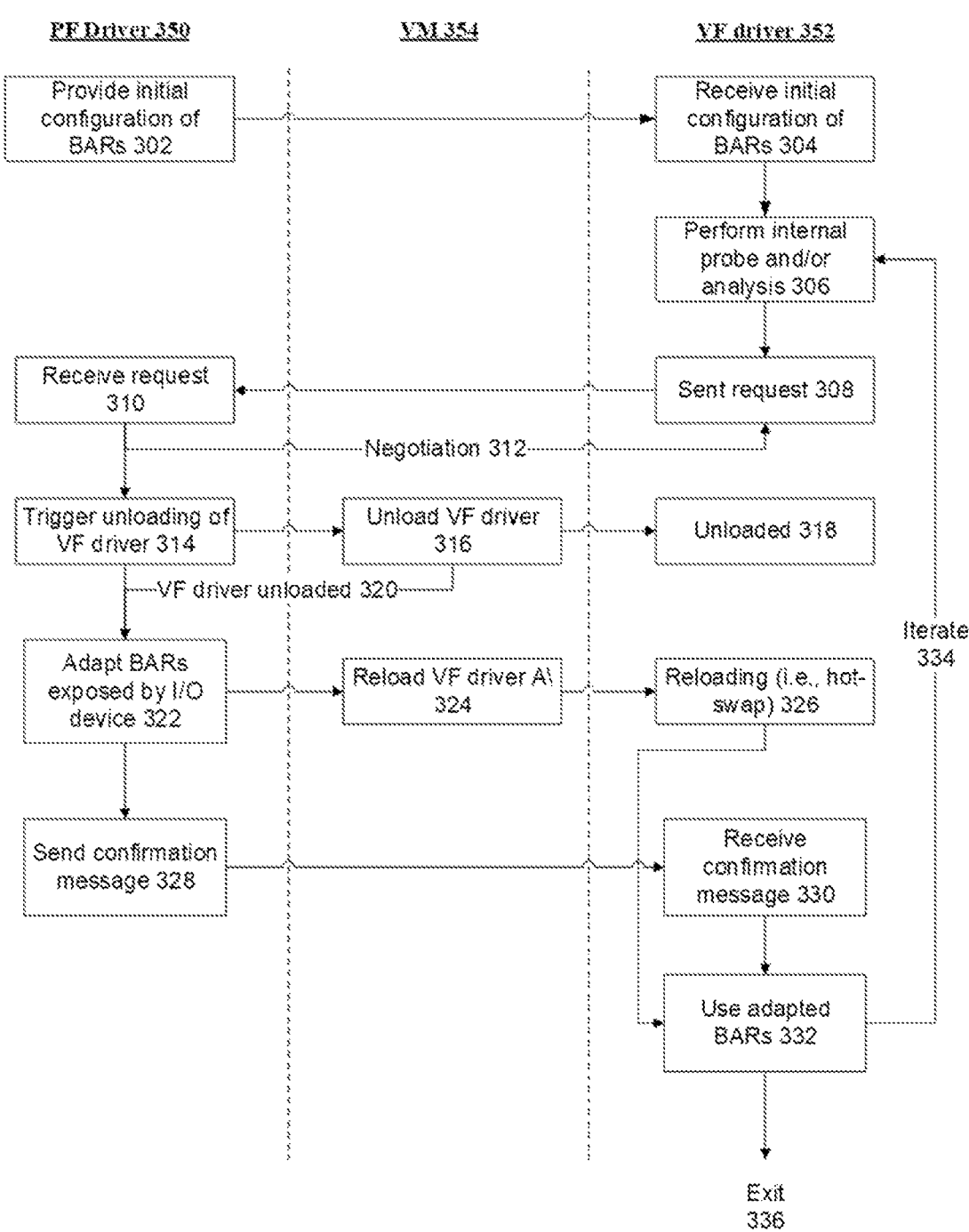
FIG. 3 is a dataflow diagram depicting exemplary dataflow between a PF driver, a VF driver and a VM that executes the VF driver for dynamically adapting, by the PF driver one or more BARs exposed by an I/O device providing virtualized hardware resources, according to a request from the VF driver executing on a VM, in accordance with some embodiments.
Figure 4:
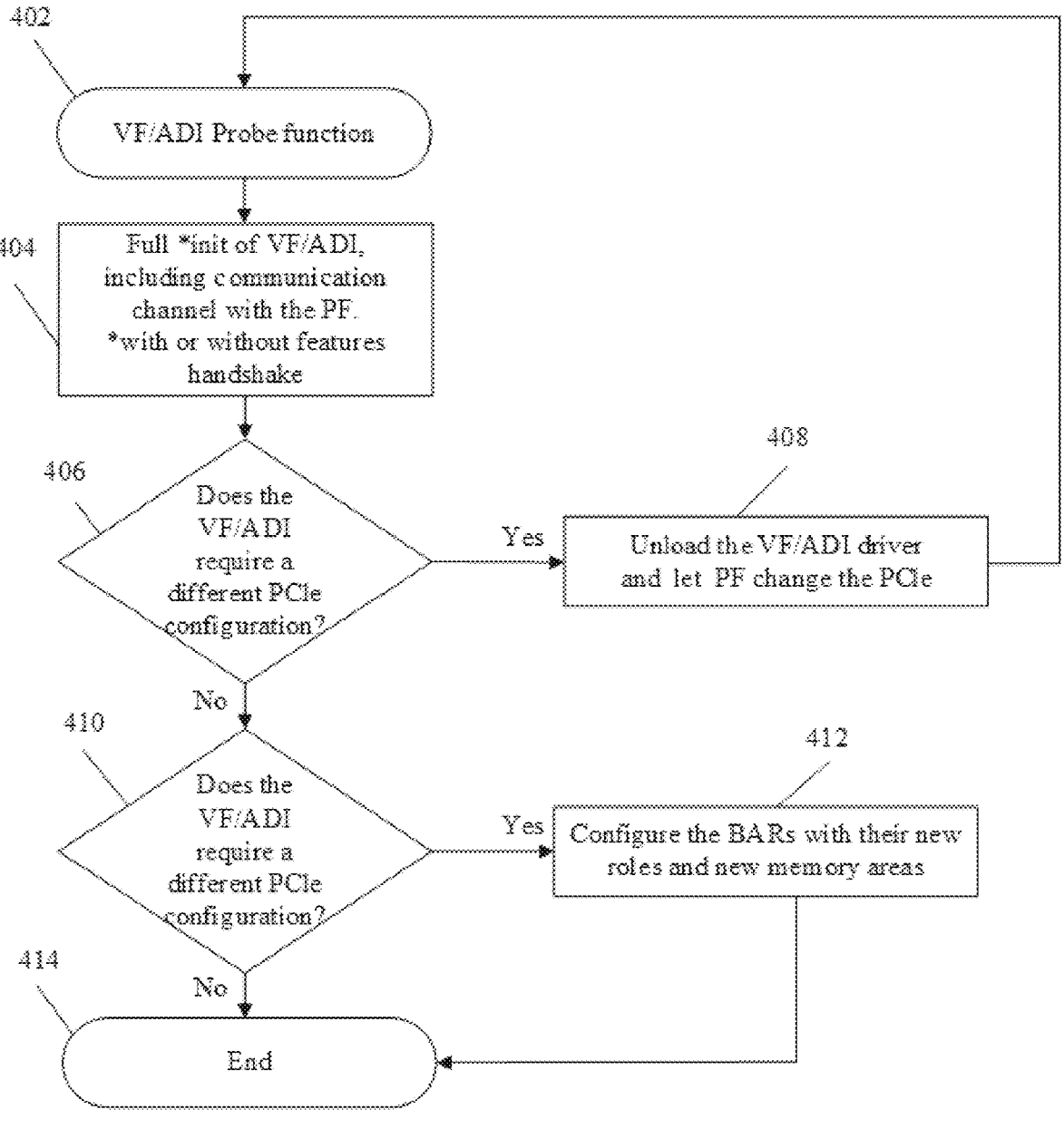
FIG. 4 is a flowchart of two step dynamic adaptation of BARs exposed by an I/O device where in a first step the VF driver is unloaded and reloaded, and in a second step the VF driver is not unloaded and reloaded, in accordance with some embodiments.
Figure 5:
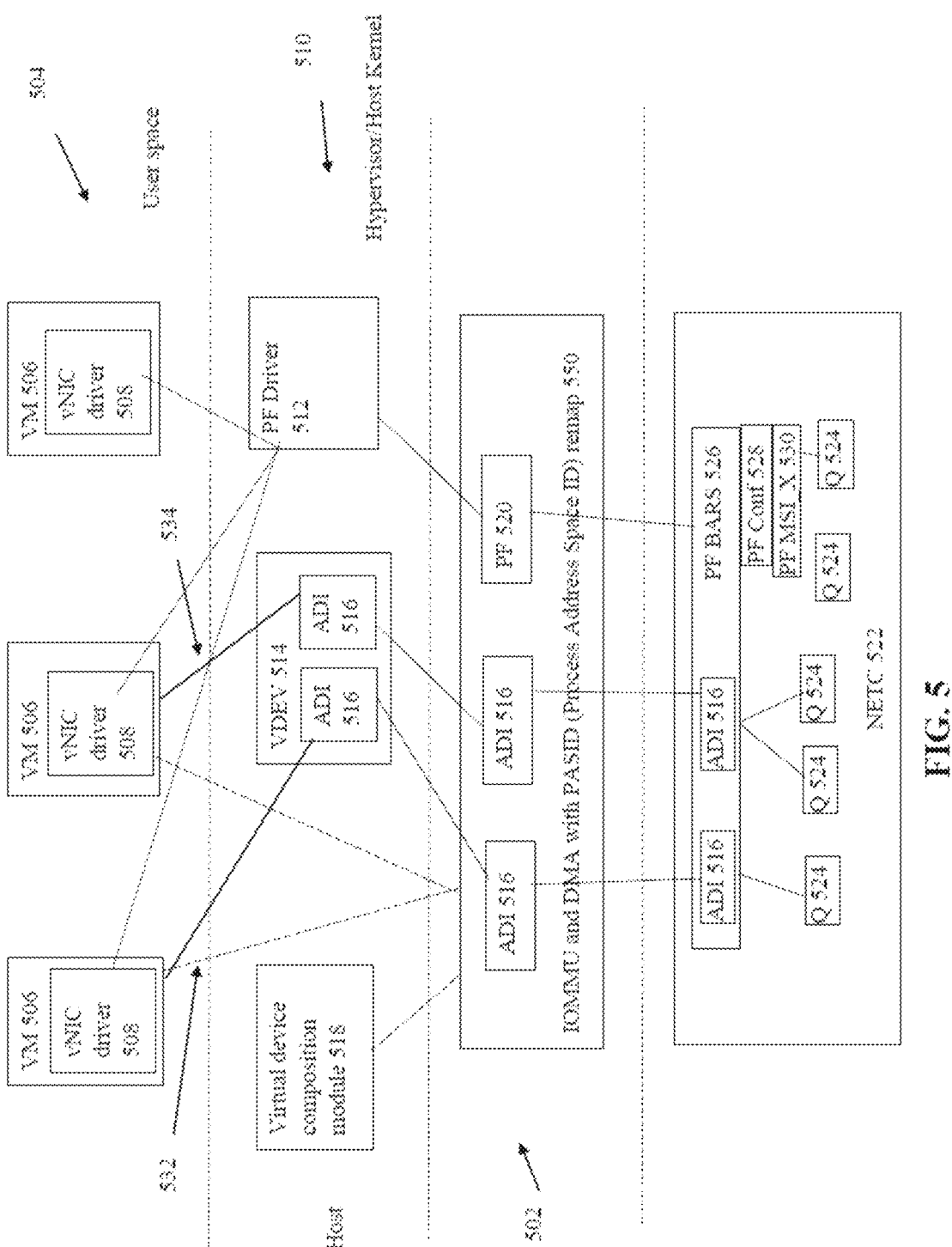
FIG. 5 is a schematic depicting an exemplary virtualized environment in which a mapping between BAR roles and I/O device BARs of virtual functions is according to a mapping-value stored in a global CSR, in accordance with some embodiments.

Reference is now made to FIG. 1, which is a block diagram of components of a computing device 104 for dynamic adaptation, by a PF driver 116, of one or more BARs 126 exposed by an I/O device 114 providing virtualized hardware resources, according to a request from a VF driver 112 executing on a VM 110, in accordance with some embodiments. Reference is also made to FIG. 2, which is a schematic depicting exemplary dataflow between components of computing device 104 described with reference to FIG. 1, in accordance with some embodiments. Reference is also made to FIG. 3, which is a dataflow diagram depicting exemplary dataflow between a PF driver, a VF driver and a VM that executes the VF driver for dynamically adapting and/or changing a number, by the PF driver one or more BARs exposed by an I/O device providing virtualized hardware resources, according to a request from the VF driver executing on a VM, in accordance with some embodiments. Reference is also made to FIG. 4, which is a flowchart of two step dynamic adaptation of BARs exposed by an I/O device where in a first step the VF driver is unloaded and reloaded, and in a second step the VF driver is not unloaded and reloaded, in accordance with some embodiments. Reference is also made to FIG. 5, which is a schematic depicting an exemplary virtualized environment 502, in accordance with some embodiments. The features described with reference to FIGS. 3-5 may be implemented by components of computing device 104 described with reference to FIG. 1 and/or FIG. 2, for example, by processor(s) 102 of a computing device 104 executing code instructions (e.g., code 106A) stored in a memory 106.

Computing device 104 may be implemented as, for example, one or more of: a computing cloud, a single computing device (e.g., client terminal), a group of computing devices arranged in parallel, a network server, a local server, a remote server, a client terminal, a mobile device, a stationary device, a kiosk, a smartphone, a laptop, a tablet computer, a wearable computing device, a glasses computing device, a watch computing device, and a desktop computer.

Processor(s) 102, implemented as for example, central processing unit(s) (CPU), graphics processing unit(s) (GPU), field programmable gate array(s) (FPGA), digital signal processor(s) (DSP), application specific integrated circuit(s) (ASIC), customized circuit(s), processors for interfacing with other units, and/or specialized hardware accelerators. Processor(s) 102 may be implemented as a single processor, a multi-core processor, and/or a cluster of processors arranged for parallel processing (which may include homogenous and/or heterogeneous processor architectures).

Memory 106 stores code instructions implementable by processor(s) 102. Memory 106 is implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Memory 106 may store virtual machine manager (VMM) 108 that manages and/or runs one or more virtual machines (VM) 110. VMM 108 may be implemented as a hypervisor. VMM 108 may be implemented in hardware, software, firmware, and/or combination of the aforementioned.

Each VM 110 executes one or more virtual function (VF) drivers 112.

Computing device 104 includes and/or is in communication with one or more I/O devices 114. The I/O devices 114 may be input/output (I/O) devices, for example, universal serial bus, network adapter (for wired and/or wireless networks), network interface card, accelerator, graphics devices, and storage device.

I/O device 114 exposes BARs 126, which are dynamically adapted by PF driver 116, as described herein.

Each I/O device 114 is associated with one or more physical function (PF) drivers 116.

Computing device 104 may include and/or be in communication with one or more data storage devices 118. Data storage devices 118 may store, for example, different versions of VMs, VF drivers, PF drivers, and/or VMM, and/or other data. It is noted that code instructions may be selectively loaded from data storage device 118 into memory 106 for execution by processor(s) 102. Data storage device(s) 118 may be implemented as, for example, a memory, a local hard-drive, a removable storage unit, an optical disk, a storage device, and/or as a remote server and/or computing cloud (e.g., accessed via a network connection).

Computing device 104 may be in communication with a network 152, for example, the internet, a local area network, a virtual network, a wireless network, a cellular network, a local bus, a point to point link (e.g., wired), and/or combinations of the aforementioned.

Computing device 104 may include a network interface for communication with network 152. The network interface may be implemented as one or more of I/O devices 114 with associated PF driver(s) 116. The network interface may be virtualized, for use by multiple VMs 110 via corresponding executed VF drivers 112. For example, different VMs 110 may access network 152 by VF driver(s) 112 that communicate with the PF driver(s) 116 of the network interface.

Computing device 104 may include and/or be in communication with one or more physical user interfaces 150 that include a mechanism for user interaction, for example, to enter data (e.g., select a version of the VF to load) and/or to view data (e.g., view the adapted BARs exposed by the I/O device).

Exemplary physical user interfaces 150 include, for example, one or more of, a touchscreen, a display, gesture activation devices, a keyboard, a mouse, voice activated software using speakers and microphone, and an orchestrator sending data over a network interface.

Referring now back to FIG. 2, I/O device 114 is virtualized via PF driver 116. The physical resources of I/O device 114 are partitioned, and made available for access and use by multiple VMs 110A-D via corresponding executed VF drivers 112A-D. Each VF driver 112A-D communicates with a PF 116 associated with I/O device 114. The VF driver 112A-D may be agnostic to the actual underlying I/O device 114 that is being used.

VF drivers 112 and PF drivers 116 are defined, for example, by the PCI express (PCIe) format, in particular, a single root input/output (I/O) virtualization (SR-IOV) feature of the PCIe. SR-IOV enables the portioning of the resources of I/O device 114 (e.g., network adapter) for use by multiple VMs 110A-D. For example, memory and/or network ports of I/O device 114 such as a network adapter are partitioned and shared by VF drives 112A-D. Network traffic streams flowing between each VF 112A-D and PF 116 may be differentiated and identified, allowing memory and/or interrupt translation between the respective VF 112A-D and PF 116 to be applied. The network traffic streams may flow between PF 116 and each respective VF 112A-D without affecting the VFs. The network traffic may achieve performance that is close to the bare metal (i.e., non-virtualized) performance.

Optionally, VF drivers 112A-D are implemented as Adaptive Virtual Function (AVF) drivers and/or assignable device interface (ADI). As used herein, the term AVF may sometimes refer to, and/or be interchangeable with, the term ADI. Multiple instances of the AVF and/or ADI are implemented on multiple VMs 110. The instances of the AVF and/or ADI VF are mapped to a single common PF driver 116. The instances of the AVF and/or ADI are concurrently and similarly adapted. The AVF adapts to changing capabilities of the physical function driver (PF) with which it is associated. Using the AVF enables updating the PF without necessarily updating all the associated VF drivers. The AVFs have a single common device ID and branding string. Adaptive Virtual Function (AVF) may be implemented as an SR-IOV Virtual Function with the same device ID on different vendor I/O devices 114. In some implementations, the AVF driver is a VF driver which supports all future vendor devices without requiring a VM update. For the AVF driver, every new drop of the VF driver adds additional advanced capabilities that may be activated in the VM when the underlying HW device supports those advanced capabilities, based on a device agnostic way without compromising on the base functionality.

Reference is now made to FIG. 3, which depicts an exemplary dataflow between a PF driver, 350, a VF driver 352, and a VM 354 that executes the VF driver 352, for dynamically adapting, by PF driver 350, one or more BARs exposed by an I/O device providing virtualized hardware resources, according to a request from VF driver 352 executing on a VM, in accordance with some embodiments.

A computing device executes VF driver 352 running on VM 354. VF driver 352 corresponds to PF driver 350. An I/O device provides virtualized hardware resources for use by multiple VF drivers of multiple VMs. VF driver 352 described herein is an example of one of the multiple VF drivers. Features described with reference to VF driver 352 may be implemented by any one of the multiple VF drivers, optionally independently by each one of the multiple VF drivers. The computing device executes a VMM that implements PF driver 350 and BARs exposed by the I/O device. PF driver 350 corresponds to the multiple VF drivers implemented by the multiple VMs.

Optionally, VF drivers are implemented as multiple instances of an adaptive VF (AVF) and/or an assignable device interface (ADI). The instances of the AVF are mapped to PF driver 350 implemented as a single common PF driver. The adapted BAR(s) exposed by the I/O device is used by the VMs implementing the instances of the AVF and/or ADI. It is noted that the ADI doesn't use BARs like VF. In case of an ADI, the driver may ask for more resources as described herein with reference to the VF, which causes the PF to do some adaptations and mapping from the PF's BAR (e.g., ADIs are using slices of pages on the PF BAR with full isolation between them using PASID).

Optionally, the I/O device implements a protocol for virtualizing hardware resources thereof, based on the Peripheral Component Interconnect Express (PCIe) standard. The PCIe may implement single-root input/output virtualization (SR-IOV).

At 302, the PF driver provides the VF driver with an indication of an initial configuration of the BARs exposed by the I/O device. The initial configuration of the I/O device may be set (e.g., by the manufacturer) to represent a minimal configuration to support a set of basic capabilities, which may be negotiated between the VF driver and the PF driver. The initial configuration of the I/O may be set with the expectation that the VF driver request an adaptation to the initial minimal configuration of the BARs, to expand the minimal configuration to support a set of advanced capabilities which may be negotiated between the VF driver and the PF driver.

The initial configuration which may be expanded improves utilization and/or computational efficiency arising from the configuration of the BARs. The initial configuration may represent the minimal requirements to run basic features, which provides maximal initial utilization and/or computational efficiency by allocation of minimal resources. The initial configuration may include the minimal number of BARs and/or smallest memory footprint BARs, such as to enable the basic set of capabilities. The initial configuration may be expanded as needed according to the requests of the VF drivers, for example, by increasing the number of BARs and/or increasing the size of memory corresponding to the BARs. Different VF drivers may expand the initial configuration according to their own respective requirements. At least some embodiments provide increased ability to discover and negotiate capabilities between the VF driver and I/O device, over standard approaches where the negotiation of the capabilities is limited by the fixed BARs exposed by the I/O device.

At 304, the VF driver receives the indication of the initial configuration of the BARs exposed by the I/O device from the PF driver. Alternatively, the VF driver having the initial configuration of the BARs exposed by the I/O device is already a given state when the VM has been executed. The BAR count and/or sizes may be defined before the VM executes, otherwise the BARs won't be mapped for the kernel and user application.

At 306, the VF driver may perform an internal probe and/or analysis to determine a target adaptation of the BARs exposed by the I/O device.

The internal probe and/or analysis to determine the target adaptation of at least one of the BARs exposed by the I/O device may be performed during a bootup of the VF driver and/or during a negotiation phase of the VF driver in negotiating basic and/or advanced capabilities with the PF driver.

The internal probe and/or analysis may be performed, for example, by comparing the requirements of the VF driver to execute its tasks, to the initial configuration of the BARs exposed by the I/O device. The internal probe and/or analysis may identify a target adaptation to the initial BARs exposed by the I/O device for obtaining the requirements of the VF driver.

At 308, the VF driver sends a request message to the PF driver. The request message includes a request to perform the target adaption of the BARs exposed by the I/O device, optionally the target adaption identified by the initial probe and/or analysis.

The VF driver may request changes to the structure of the BARs, i.e., change in size of the memory corresponding to one or more BARs, and/or a change (e.g., increase) in number of BARs.

Optionally, the request is sent from the VF driver to the PF driver via a hardware mailbox process. The mailbox may be part of a mutual operation that uses the initial configuration of the BARs designed to provide common functionality of basic functions.

At 310, the PF drives receives the request message from the VF driver, which includes the request to adapt at least one of the BARs exposed by the I/O device.

The request message may include adaptations for which a reload of the VF driver is instructed to unload and reload as a reloaded VF driver in order to use the adapted BARs exposed by the I/O device, and/or for which the VF driver is not necessarily instructed to unload and reload as a reloaded VF driver in order to use the adapted BARs exposed by the I/O device.

Exemplary adaptations of the BARs exposed by the I/O device, for which the VF driver is instructed to unload and reload as a reloaded VF driver in order to use the adaptations (e.g., by implementing 314-320, and 324-326) include changes to the structure of the BARs, for example, increasing a size of a memory corresponding to a certain BAR, increasing a number of a certain BAR, and adapting a structure of a certain BAR.

Exemplary adaptations of the BARs exposed by the I/O device, for which the VF driver may continue to operate using the adaptations without necessarily undergoing an unload/reload cycle (e.g., by excluding 314-320, and 324-326) include, for example, adapting of an existing role of a certain BAR to a new role and adapting a structure of a certain BAR. The VF driver may request a change of a role of the existing BAR(s) where the VF driver uses the certain BAR to perform the new role during operation thereof, without an unload and reload cycle The VF driver does not need to necessarily unload and reload for the change of role to be effective, but may continue to operate.

The request to adapt the BARs exposed by the I/O device may include adaptions for which the VF driver is instructed to undergo an unload and reload cycle and/or adaptations for which the VF driver is not instructed to undergo the unload and reload cycle. There may be two separate requests, the first request for which the VF driver is instructed to undergo the unload and reload cycle, and a second request for which the VF driver is instructed to undergo the unload and reload cycle. Alternatively, there is a single request for which the VF driver is instructed to undergo an unload and reload cycle. Alternatively, there is a single request for which the VF driver is not instructed to undergo an unload and reload cycle.

Optionally, before implementing the adaptations, the adaptations are analyzed to determine whether any adaptations require a reload of the VF driver. In one implementation, all of the adaptations, for which an unload/reload cycle is required and for which the unload/reload cycle is not required, are performed and the VF driver undergoes an unload and reload cycle. In another implementation, first, the adaptations for which no unload/reload cycle is required are implemented, for example, according to a first request, or in a single request. Once the first set of adaptations have been performed and the VF driver is using the BARs that were adapted according to the first adaptation, the second set of adaptation for which the unload/reload cycle is required are implemented, for example, according to a second request, or in the single request. The VF driver undergoes the unload/reload cycle and is using the BARs that were adapted according to the second adaptation. The flow described herein depicts all described cases.

Alternatively, the request to adapt the BARs exposed by the I/O device includes a first request, in response to which the VF driver is instructed to unload and reload as a reloaded VF driver. The VF driver provides a second request, which may be provided after the VF driver completed the unload and reload cycle, and/or as part of the initial first request. The second request includes adaptations for which no unload and reload cycle is needed. In response to implementation of the second request, the reloaded VF driver uses the adapted BAR to perform the new role during operation thereof, without having undergone another unload and reload cycle.

At 312, the PF driver and the VF driver negotiate on a set of adaptations to the BARs exposed by the I/O device for implementation. The BARs exposed by the I/O are then adapted according to the negotiated set of adaptations. The request sent from the VF driver to the PF driver may serve as an initial baseline for the negotiations. The VF driver and PF driver may negotiate on which of the adaptations is implemented, providing flexibility to the VF driver and the PF driver in selecting and implementing the adaptations to the BARs.

The negotiation process may include the features of analyzing, by the PF driver, the request message to determine which of the requested adaptations of the BARs exposed by the I/O device are implementable by the PF driver and/or by the I/O driver. For example, whether the VF driver is asking a reasonable request that can be met, whether the request of the VF driver will impact other VMs (e.g., other customers), and/or whether a customer qualifies (e.g., has paid) for the adaptations requested by the VF driver. A negotiation message may be provided by the PF driver to the VF driver with an indication of which of the adaptations of the BARs exposed by the I/O device are implementable. The VF driver may send a response to the negotiation message to the PF driver indicating which of the implementable adaptations of the BARs exposed by the I/O device the VF driver selects to implement. The PF driver may adapt the BARs exposed by the I/O device according to the response to the negotiation message.

At 314, when the request from the VF driver includes adaptations for which the VF driver requires an unload and reload cycle, the PF driver transmit data to the VM to trigger an unloading of the VF driver. For example, the PF driver send instructions to the VM to unload the VF driver.

At 316, the VM unloads the VF driver.

At 318, the VF driver is unloaded.

At 320, a message indication the unloading of the VF driver may be provided to the PF driver.

At 322, the PF driver adapts the BARs exposed by the I/O device according to the request message.

When the adaptation is for execution by a reloaded VF driver having undergone an unload and reload cycle, the PF driver adapts the BARs in response to receiving an indication that the VF driver is unloaded. When the adaption is for execution by the VF driver that does not require an unload and reload cycle, the PF driver may perform the adaption in response to receiving the request from the VF driver.

At 324, when the VF driver is in the unloaded state, and in response to the PF driver completing the adaptation to the BARs exposed by the I/O device, the VM receives from the PF driver or the VMM, transmitted instructions to perform a hot-swap by rescanning the bus without rebooting the VM.

At 326, the VF driver, which is in the unloaded state, undergoes the hot-swap by being reloaded without rebooting the VM. A re-enumeration and/or re-scan may be executed by the VM on the bus (e.g., PCIe) before the VF driver is reloaded. Once the re-enumeration and/or re-scan (hot-swap) is complete, the VF driver identifies the adapted BARs exposed by the I/O device.

At 328, a confirmation message may be sent from the PF to the VF driver indicating the adaptation to the BARs exposed by the I/O device have been completed.

At 330, the confirmation message from the PF driver indicating that the target adaption to the BARs exposed by the I/O is implemented, is received by the VF driver. It is noted that prior to the confirmation message being received, the VF driver may undergo the probe described herein for initializing the mailbox. Once the VF driver is loaded and initialized, the confirmation message may be received.

At 332, the VF driver beings using the adapted BARs. The adapted BARs may be used by the VF driver in response to receiving the confirmation message and/or upon completion of the re-enumeration and/or re-scan by the reloaded and hot-swapped VF driver.

The VF driver may access regions of memory allocated to the BARs exposed by the I/O device which were adapted as described herein.

The VF driver may use the adapted BARs exposed by the I/O device for operation of a feature(s) and/or application(s) and/or loading of the feature(s). The application(s) and/or feature(s) may execute using the adapted BARs exposed by the I/O device.

At 334, features 306-332 may be iterated, dynamically during operation of the VF driver. For example, the VF driver re-performs the internal probe and/or analysis (e.g., as described with reference to 306) dynamically during operation of the feature(s) and/or application(s) and/or loading of the feature(s) and/or the application(s) executed using the adapted BARs exposed by the I/O device, to determine another target adaptation of the previously adapted BARs exposed by the I/O device. The another target adaptation may be selected to improve performance and/or enable operation of the feature(s) and/or application(s).

At 336, the process exits, i.e., finished the driver load flow or terminates.

Referring now back to FIG. 4, as used herein, the VF driver may sometimes be interchanged with the AVF or ADI driver.

At 402, a VF driver probe function is executed.

At 404, The VF drier is initialized. Communicating between the VF driver and the PF driver is established. The VF driver and the PF driver may perform a handshake procedure to negotiate on basic and/or advanced features.

At 406, a first analysis session of two analysis sessions is performed.

The first analysis is performed to determine whether the VF driver requires an adaptation to the structure of the BARs exposed by the I/O device, optionally a PCIe I/O device. The change to the structure of the BARs exposed by the I/O device may be used by the VF driver after undergoing an unload and reload cycle.

A first request defining a first target adaptation of the BARs exposed by the I/O device may be generated based on the first analysis. The first request is provided by the VF driver to the PF driver.

The analysis may be done, for example, by the VF driver performing an internal probe and/or analysis to determine a target adaptation of at least one of the BARs exposed by the I/O device.

At 408, the VF driver is unloaded, optionally by the VM. In response to the unloading of the VF driver, the adaptation to the structure of the BARs exposed by the I/O device is performed, optionally by the PF driver. The adaptation may be defined by the first request issued by the VF driver to the PF driver. Examples of adaptations to the structure of the BARs exposed by the I/O device for which an unload and reload cycle of the VF driver is performed so that the reloaded VF driver may use the adapted BARs include increasing a size of a memory corresponding to one or more of the BARs exposed by the I/O device, and increasing a number of BARs of the I/O device. In response to completion of the adaption of the structure of the BARs exposed by the I/O device, the VF driver is reloaded. Features 402-406 are iterated, to reload the VF driver and determine whether additional adaptations to the structure of the BARs exposed by the I/O device are required.

At 410, when no additional adaptations to the structure of the BARs exposed by the I/O device are required, a second analysis session is performed.

The second analysis is performed to determine whether the VF driver requires an adaptation to the configuration of the BARs exposed by the I/O device. The change to the configuration of the BARs exposed by the I/O device may be used by the VF driver after the change is made, after without undergoing an unload and reload cycle.

A second request defining a second target adaptation of the BARs exposed by the I/O device may be generated based on the second analysis. The second request is provided by the VF driver to the PF driver.

The analysis may be done, for example, by the VF driver performing an internal probe and/or analysis to determine a target adaptation of at least one of the BARs exposed by the I/O device, for example, as described with reference to 306 of FIG. 3.

At 412, the adaptation to the configuration of the BARs exposed by the I/O device is performed, optionally by the PF driver. The adaptation may be defined by the second request issued by the VF driver to the PF driver. Examples of adaptations to the structure of the BARs exposed by the I/O device for which an unload and reload cycle of the VF driver not required, where the VF driver may use the adapted BARs without unloading and reloading include adapting an existing role of a certain BAR to a new role.

At 414, when the structural and/or configuration adaptations to the BARs exposed by the I/O device have been made, the VF driver may use the adapted BARs. For example, to access regions of memory allocated to the adapted BARs exposed by the I/O device.

Referring now back to FIG. 5, a scalable IVO setup (S-IOV) may be implemented in virtualized environment 502. A PF driver 512 may dynamically map one or more BARs 526 exposed by an I/O device 522 implemented as a network card (NETC) 522 providing virtualized hardware resources, according to a request from a virtual network interface controller (vNic) 508 executing on a VM 506.

Virtualized environment 502 includes one or more of the following exemplary components:

A user space 504 includes one or more VMs 506, each implementing vNic driver 508 that communicates with ADI 516. It is noted there are no VF implemented in scalable IOV virtualized environment 502. ADIs are used instead.

A hypervisor/host kernel space 510 that includes PF driver 512, a virtual device (VDEV) 514 implementing one or more assignable device interfaces (ADI) 516, and a virtual device composition module (VDCM) 518. Virtual device composition module 518 may provide software managed resource mapping between VDEV 514 and ADIs 516.

An input/output memory management unit (IOMMU) 550 and direct memory access (DMA) with Process Address Space ID (PASID) remap code 520 implements one or more ADIs 516 and a PF 520. Each ADI 516 is tagged with a unique PASID.

NETC 522 may be compliant with PCIe. The hardware resources of NETC 522 are virtualized via ADI 516, enabling multiple VMs 506 to each access its own assigned ADI 516 to receive and/or transmit traffic via an attached network, for example, via one or more corresponding queues (Q) 524.

NETC 522 exposes PF base address registers (BARs) 526 that map to ADIs 516, which are dynamically adapted as descried herein. Each ADI 516 is able to access a different isolated portion of the PF BARs 526, and can't access the other portions of the PF BARs 526. NETC 522 may include additional registers, for example a PF configuration (Conf) register 528, and an MSI-X register 530.

Virtualizing the resources of the NETC 522 using software may deliver a near bear metal performance.

Virtual device composition module 518 may provide a slow path enumeration (denoted by dashed lines 532) and a fast path enumeration (denoted by solid lines 534) pass-through. Slow path enumeration (denoted by dashed lines 532) is by software. Fast path enumeration (denoted by solid lines 534) is by hardware that is provisioned for direct access. DMA provides isolation between fast paths. Each vNic driver 508 is provided with an isolated fast path via DMA to partitioned resources of NETC 522 via its assigned ADIs 516 using the corresponding unique PASID.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, practical application or technical improvement over technologies found in the marketplace, or to enable others of ordinary skill in the art to understand the embodiments disclosed herein.

It is expected that during the life of a patent maturing from this application many relevant drivers will be developed and the scope of the term driver is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A computing device in communication with an input/output (I/O) device providing virtualized hardware resources for use by a plurality of virtual function (VF) drivers of a plurality of virtual machines (VMs), the computing device executing a virtual machine manager (VMM) that implements a physical function (PF) driver and a plurality of base address registers (BARs) exposed by the I/O device, wherein the PF driver is associated with the plurality of VF drivers implemented by the plurality of VMs, and the PF driver is configured to:

receive a request message from a VF driver of the plurality of VF drivers, the request message including a request to adapt at least one of the BARs exposed by the I/O device;

adapt the at least one of the BARs exposed by the I/O device according to the request message; and provide a confirmation message to the VF driver indicating the adaptation to the at least one of the BARs exposed by the I/O device.

2. The computing device of claim 1, wherein the request to adapt the at least one of the BARs exposed by the I/O device comprises at least one of the following (a)-(c):

(a) increasing a size of a memory associated with a certain BAR, (b) increasing a number of a certain BAR, and (c) adapting a structure of a certain BAR.

3. The computing device of claim 2, wherein the PF driver is further configured to:

in response to receiving the request message from the VF driver, transmit data to one of the plurality of VMs that triggers an unloading of the VF driver;

in response to unloading of the VF driver, adapt the at least one of the BARs exposed by the I/O device according to the request message; and in response to completing the adaptation to the at least one of the BARs exposed by the I/O device, transmit instructions to the one of the plurality of VMs to perform a hot-swap by reloading the VF driver without rebooting the one of the plurality of VMs, wherein the hot-swap is a re-enumeration and/or re-scan performed by the one of the plurality of VMs, and wherein after completion of hot-swap, the loaded VF driver identifies the adapted at least one BAR exposed by the I/O device.

4. The computing device of claim 1, wherein the request to adapt at least one of the BARs exposed by the I/O device comprises at least one of the following (a) and (b):

(a) adapting of an existing role of a certain BAR to a new role; and (b) adapting a structure of a certain BAR.

5. The computing device of claim 4, wherein the VF driver uses the certain BAR to perform the new role during operation thereof, without an unload and reload cycle.

6. The computing device of claim 5, wherein the request to adapt the at least one of the BARs exposed by the I/O device comprises first and second requests, wherein, in response to the first request, the VF driver is instructed to unload and reload as a reloaded VF driver, wherein the first request includes at least one of the following:

(a) increasing a size of a memory corresponding to a certain BAR, and (b) increasing a number of a certain BAR, and wherein the VF driver provides the second request adapts an existing role of a certain BAR to a new role, in response to which the reloaded VF driver uses the certain BAR to perform the new role during operation thereof, without an unload and reload cycle.

7. The computing device of claim 1, wherein the PF driver is further configured to provide the VF driver with an indication of an initial configuration of the BARs exposed by the I/O device, wherein the initial configuration representing a minimal configuration to support a set of basic capabilities negotiated between the VF driver and the PF driver, and wherein the request to adapt comprises a request to expand the minimal configuration to support a set of advanced capabilities negotiated between the VF driver and the PF driver.

8. The computing device of claim 1, wherein the PF driver is further configured to negotiate with the VF driver on a set of adaptations to the at least one of the BARs exposed by the I/O device for implementation, wherein adapting the at least one of the BARs exposed by the I/O device comprises: adapting at least one BAR according to the negotiated set of adaptations.

9. The computing device of claim 8, wherein negotiating with the VF driver on the set of adaptations to the at least one of the BARs comprises:

analyzing the request message to determine which of the requested adaptations of the at least one of the BARs exposed by the I/O device are implementable;

providing a negotiation message to the VF driver with an indication of which of the adaptations of the at least one of the BARs exposed by the I/O device are implementable; and receiving a response to the negotiation message from the VF driver indicating which of the implementable adaptations of the at least one of the BARs exposed by the I/O device implementable the VF driver selects to implement, wherein adapting the at least one of the BARs comprises adapting the at least one of the BARs exposed by the I/O device according to the response to the negotiation message.

10. The computing device according to claim 1, wherein the PF driver is further configured to adapt at least one BAR of the I/O device according to the request via a hardware mailbox process.

11. The computing device of claim 1, wherein the I/O device implements a protocol for virtualizing hardware resources thereof based on a Peripheral Component Interconnect Express (PCIe) standard.

12. The computing device of claim 11, wherein the PCIe implements single-root input/output virtualization (SR-IOV).

13. The computing device of claim 1, wherein a plurality of instances of an adaptive VF (AVF) and/or assignable device interface (ADI), are implemented as the plurality of VF drivers, the plurality of instances of the AVF are mapped to the PF driver implemented as a single common PF driver, wherein the adapted at least one BAR expose by the I/O device is used by the plurality of VMs implementing the plurality of instances of the AVF and/or ADI.

14. A computing device in communication with an input/output (I/O) device providing virtualized hardware resources for use by a plurality of virtual function (VF) drivers of a plurality of virtual machines (VMs), wherein the first computing device executes a virtual machine manager (VMM) that implements a physical function (PF) driver and a plurality of base address registers (BARs) exposed by the I/O device, wherein the PF driver is associated with the plurality of VF drivers implemented by the plurality of VMs, and wherein the PF driver is configured to:

receive a request message from a VF driver of the plurality of VF drivers, the request message including a request to adapt at least one of the BARs exposed by the I/O device;

adapt the at least one of the BARs exposed by the I/O device according to the request message; and provide a confirmation message to the VF driver indicating the adaptation to the at least one of the BARs exposed by the I/O device; and wherein the VF driver is associated with the PF driver and the I/O device for providing virtualized hardware resources, and wherein the VF driver is configured to:

receive an indication of the plurality of BARs exposed by the I/O device;

perform an internal probe and analysis to determine a target adaptation of the at least one of the BARs exposed by the I/O device;

send the request message to the PF driver;

receive the confirmation message from the PF driver; and access regions of memory allocated to the plurality of BARs exposed by the I/O device and adapted according to the target adaptation.

15. The computing device according to claim 14, wherein the internal probe and analysis to determine the target adaptation of at least one of the BARs exposed by the I/O device is performed during a negotiation phase of a bootup of the VF driver, wherein the and negotiation phase negotiates capabilities with the PF driver.

16. The computing device according to claim 14, wherein the internal probe and analysis to determine the target adaptation of at least one of the BARs exposed by the I/O device is performed dynamically during operation of a feature and/or application and/or loading of the feature and/or the application executed using the BARs exposed by the I/O device, wherein the target adaptation is selected to improve performance and/or enable operation of the feature and/or application.

\* \* \* \* \*